(12) United States Patent
Williams et al.

(10) Patent No.: US 7,787,610 B1
(45) Date of Patent: Aug. 31, 2010

(54) AUTOMATIC CALL DIRECTOR FIRST IN FIRST OUT LOAD-BALANCING ACCESSORY

(75) Inventors: Mark J. Williams, North Canton, OH (US); Eric I. Camulli, Copley, OH (US); James T. Pavlic, Bath, OH (US)

(73) Assignee: Virtual Hold Technology, LLC, Akron, OH (US)

( * ) Notice: Subject to any disclaimer, the term of this patent is extended or adjusted under 35 U.S.C. 154(b) by 1579 days.

(21) Appl. No.: 10/915,179

(22) Filed: Aug. 10, 2004

(51) Int. Cl.
*H04M 3/00* (2006.01)

(52) U.S. Cl. .......................... 379/265.02; 379/265.01; 379/266.01; 379/266.03; 379/266.05; 379/266.07

(58) Field of Classification Search ............ 379/265.02, 379/266.01
See application file for complete search history.

(56) References Cited

U.S. PATENT DOCUMENTS

| | | | | |
|---|---|---|---|---|
| 5,227,994 A | | 7/1993 | Mitsuharu ................ 364/750.5 |
| 5,311,574 A | * | 5/1994 | Livanos ................. 379/209.01 |
| 5,530,744 A | * | 6/1996 | Charalambous et al. ..................... 379/266.08 |
| 6,263,065 B1 | * | 7/2001 | Durinovic-Johri et al. ..................... 379/266.03 |
| 6,563,921 B1 | * | 5/2003 | Williams et al. ....... 379/266.01 |
| 6,754,334 B2 | * | 6/2004 | Williams et al. ....... 379/266.01 |
| 6,850,612 B2 | * | 2/2005 | Johnson et al. ........ 379/265.02 |
| 2003/0165223 A1 | * | 9/2003 | Timmins et al. ....... 379/207.02 |

\* cited by examiner

*Primary Examiner*—Rasha S Al Aubaidi
*Assistant Examiner*—Khai N Nguyen
(74) *Attorney, Agent, or Firm*—Pearne & Gordon LLP

(57) ABSTRACT

An accessory device for a plurality of servers, the servers allocating client primary resource requests to primary resources, each server having a primary queue, the device including: a controller; a plurality of server communication links adapted to communicate with a respective server and to intercept client primary resource requests in response to the controller; an auxiliary queue, the device storing the intercepted requests in the auxiliary queue in response to the controller; and a secondary resource communication link adapted to communicate with at least one secondary resource. The device allocates secondary resource requests to at least one secondary resource in response to the controller. The device routes the intercepted requests to a selected server via at least one of the server communication links in response to a desired condition.

16 Claims, 4 Drawing Sheets

AUTOMATIC CALL DIRECTOR FIRST IN FIRST OUT LOAD-BALANCING ACCESSORY

BACKGROUND OF THE INVENTION

The present invention relates to automatic call directors and, in particular, to accessories for maintaining first in first out call processing across a number of automatic call directors.

Automatic call directors (ACDs) and their more simpleminded cousins, private branch exchanges, are used to connect callers with agents and other resources (e.g., modems, facsimile machines, voice mail, etc.). The typical ACD connects callers with resources until all resources are in use. At that point, further callers are placed in a hold queue until a resource becomes available. Normally the first in this hold queue will be the first out of the queue (i.e., a first in first out (FIFO) queue).

Current ACDs are designed to handle callers in the described manner. A caller waits in the queue until a resource is available and is removed from the queue upon being connected to a resource. If the caller is returned to the queue for some reason the callers will be added to the end of the queue. For example, ACDs manufactured by Lucent, Siemens, and Nortel operate in this manner.

Increasingly there are resources that may be thought of as secondary resources, not the reason for the call, but a resource that the caller may be connected to prior to being connected to the desired primary resource.

Resources that may be classified as secondary resources include voice mail (for voice mail independent of the main call (e.g., expressing an opinion of the calling experience while waiting for the primary resource)); information on demand systems, that provide prerecorded information on topics chosen by the caller while waiting; or non-agent telephones (e.g., calling a particular party on an ancillary matter while waiting for the primary resource).

Another secondary resource is an automatic call back system. These systems take a call on hold, obtain call back information and calls back the caller at some future time. Such a system is disclosed in U.S. Pat. No. 5,227,884 and is incorporated herein by reference.

ACDs available today do not permit a caller's place to be maintained in the hold queue while accessing these secondary resources. When the caller is connected to the secondary resource, the caller's place in the queue is released. Upon being released from the secondary resource, the caller goes to the end of the line in the hold queue for the primary resource. The caller's queue status has been lost.

As taught in U.S. Pat. No. 6,754,334, also incorporated herein by reference, it is possible to add an accessory device to an ACD to provide enhanced queue management of the ACD's internal queue.

This solves many performance problems associated with single ACDs, but it is increasingly common for multiple ACDs to be linked together into networks of call centers. These networks may extend to locations scattered about the globe. In these situations, it becomes desirable to be able to manage resources on a network-wide basis. For example, if a call is placed into a call back system on one ACD, it would be useful if the call back could occur at the desired call back time on whatever ACD is then currently the least busy. Unfortunately, present networks of ACDs do not allow for this sort of network-wide management of resource queues.

SUMMARY OF THE INVENTION

An accessory device for a plurality of servers, the servers allocating client primary resource requests to primary resources, each server having a primary queue, the device including: a controller; a plurality of server communication links adapted to communicate with a respective server and to intercept client primary resource requests in response to the controller; an auxiliary queue, the device storing the intercepted requests in the auxiliary queue in response to the controller; and a secondary resource communication link adapted to communicate with at least one secondary resource. The device allocates secondary resource requests to at least one secondary resource in response to the controller. The device routes the intercepted requests to a selected server via at least one of the server communication links in response to a desired condition.

DESCRIPTION OF THE PREFERRED EMBODIMENTS

Figure 1:
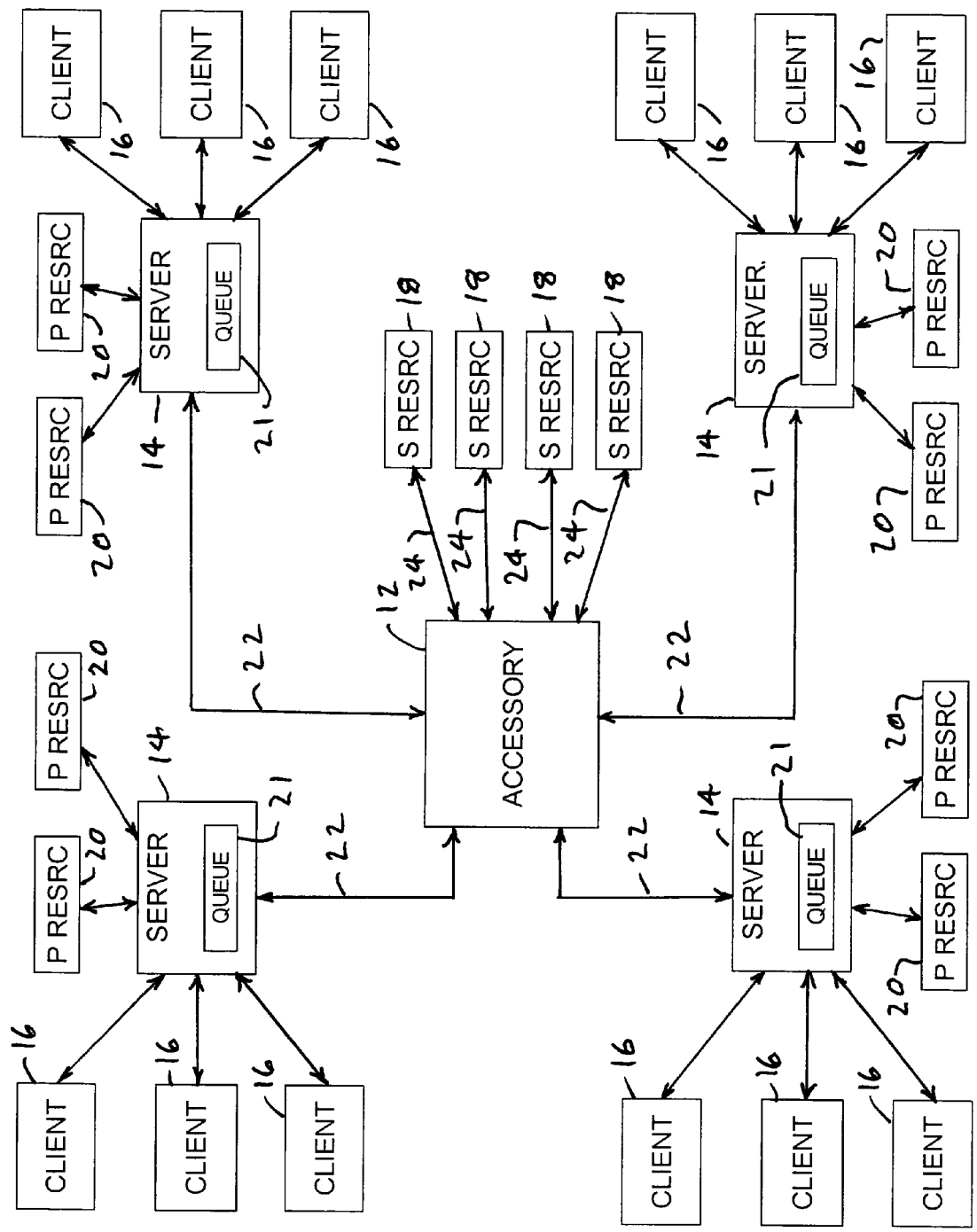
FIG. 1 is block diagram of an embodiment of a system for assigning resources to clients according to the invention.

Referring to FIG. 1, a FIFO accessory 12 is used to maintain the queue status for a group of servers 14 that are not themselves configured to maintain the status of clients 16 that will access secondary resources 18 while waiting for primary resources 20. In this embodiment, the accessory 12 receives client information and resource requests from each server 14 and controls placement of client information and resource requests into the primary queue 21 of each of the servers 14 via a client/server communications link 22.

The accessory 12 is responsive to requests by the clients 16 for secondary resources 18. It provides secondary resources 18 via a secondary resource communications link 24. Unlike the servers 14, the accessory 12 maintains the queue entry for the clients 16 even when a client is accessing a secondary resource 18.

Figure 2:
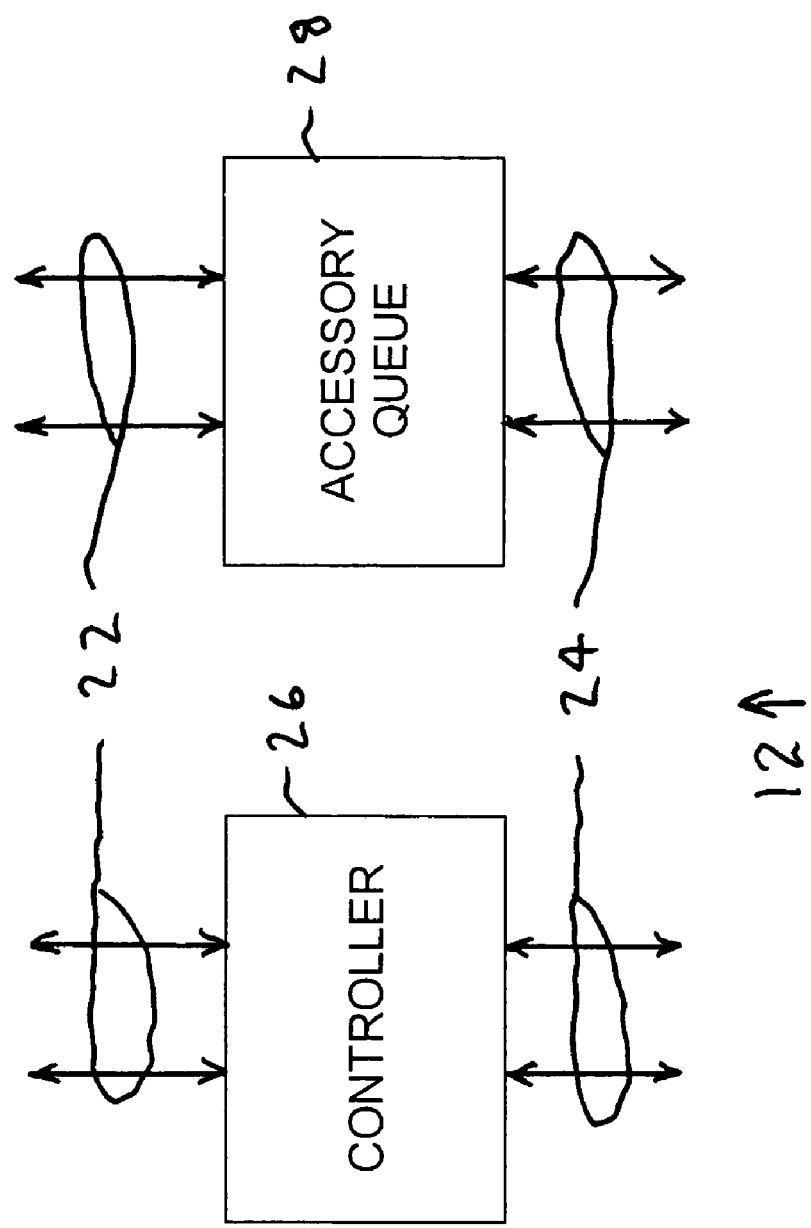
FIG. 2 is a block diagram of an accessory device according to the invention.

Referring to FIG. 2, the accessory 12 includes a controller 26 and an auxiliary queue 28. The controller 26 controls the client/server communication link 22, the secondary resources link 24 and auxiliary queue 28. The controller 26 and auxiliary queue 28 may be conveniently implemented using a microcomputer-based system, but such devices as programmable controllers, custom integrated circuits, and other devices known to those skilled in the art may be employed. The controller 26 and auxiliary queue 28 are distinct from the servers 14.

In operation, the accessory 12 will typically pass all client requests for primary resources 20 directly to a server 14 as long as primary resources 20 are available on that server. If all primary resources 20 are in use by other clients, the primary queue 21 of a server 14 will begin to fill. As the primary queue 21 fills, the controller 26 will begin placing the client requests in the auxiliary queue 28 instead of in the primary queue 21. The threshold number of entries in the primary queue 21 at which the accessory 12 stops and starts placing client requests in the primary queue 21 may be chosen based on the likely wait period in the primary queue 21. If the wait period will likely be too short to allow a client to make use of the secondary resources 20, the client requests can conveniently wait in the primary queue 21.

It is possible to utilize other criteria to determine when the accessory 12 should start and stop placing client requests in the primary queue 21. For example, if all secondary resources are disabled, all client requests could be placed in primary queues 21.

Once in the auxiliary queue 28, the controller 26 offers the clients access to the secondary resources 24. This is accomplished by such well-known techniques as announcements, interactive voice response and voice response units. In some cases, access may be forced (e.g., a mandatory automatic call back system).

The intercepted client requests for primary resources in the auxiliary queue 28 are maintained even while the client 16 accesses the secondary resources 18. This information includes the order and/or time of the client's request for primary resources.

In a preferred embodiment of the invention, this information is used to provide FIFO operation of not only the auxiliary queue 28, but also the primary queues 21. Entries are not placed into a primary queue 21 by the accessory 12 until the order of the entries is immutable (i.e., no more access of secondary resources are permitted and thus there is no way for the client to "get out of line" at that point).

The device 12 may be advantageously used to balance the primary resource request load between all of the servers 14. The device 12 is aware of the queue status of each of the servers 14 and thus may selectively route primary resource requests to the server 14 best suited to handle the request.

Alternatively, the device 12 may intercept and return primary resource requests to the servers 14 acting as a network cloud where the severs 14 determine the load balancing once the device 12 returns a primary resource request to the servers 14.

The device 12 may be distributed across multiple locations, for example, at each server 14 location. However, the distributed portions would maintain communication and perform in the ways described above.

In addition, it is possible to maintain other ordering information in the auxiliary queue 28. For example, clients might have differing priority levels. In this case, the priority level would be part of determining when the client left the auxiliary queue 28.

Various options are possible if a client is accessing a secondary resource when it reaches the head of the auxiliary queue 28. Depending on the nature of the secondary resource, it may be immediately disconnected from the secondary resource, warned of a pending disconnect, or given a choice to disconnect. It is expected that in the cases of delayed disconnection, the clients will just "step aside" until disconnection from the secondary resource.

Figure 3:
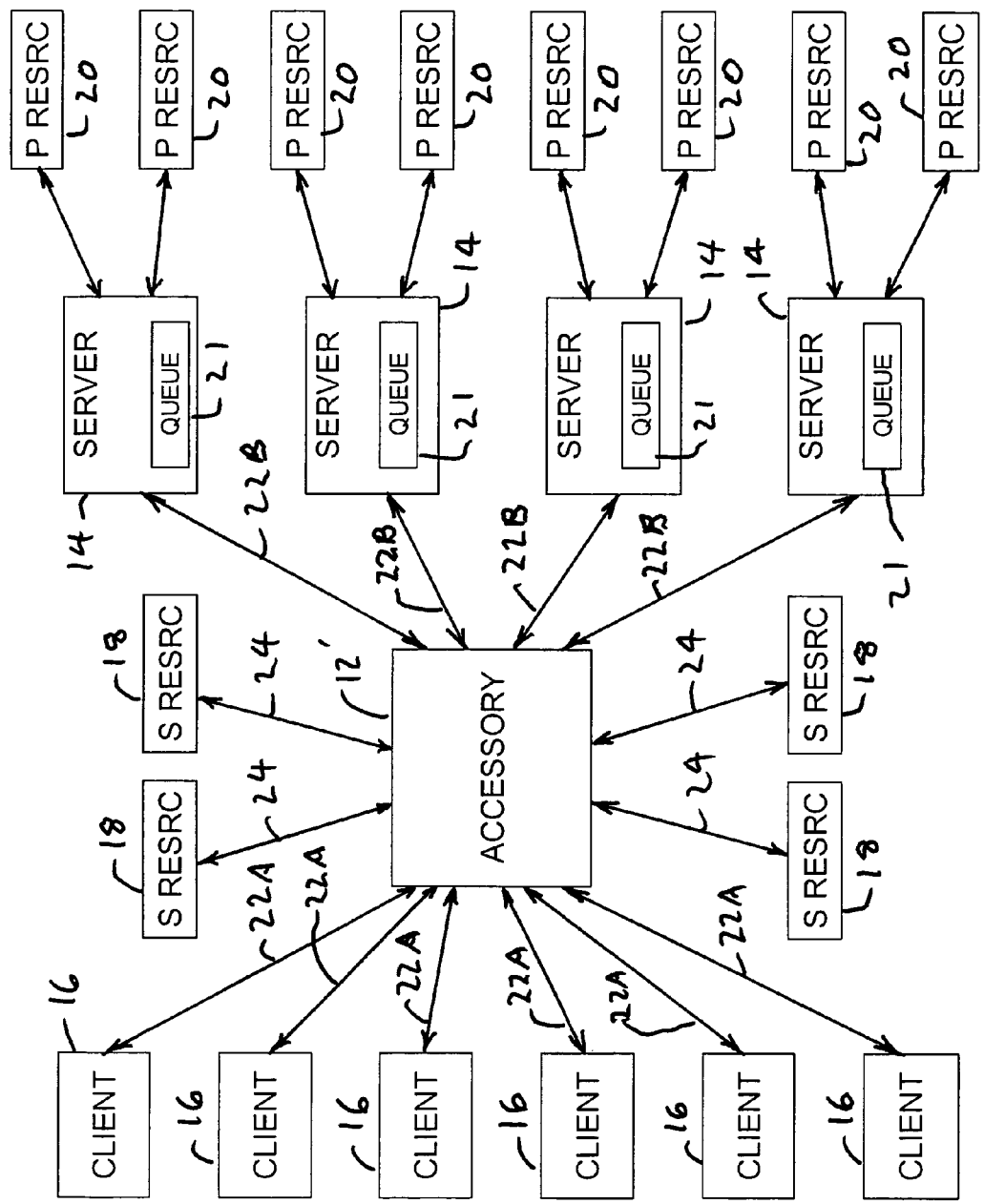
FIG. 3 is a block diagram of an additional embodiment of a system for assigning resources to clients according to the invention.

Referring to FIG. 3, another preferred embodiment of the invention places the accessory 12' between the clients 16 and the servers 14. As above, similar options and alternatives are possible. The accessory 12' intercepts the primary resource requests directly from the clients 16 via the client communications link 22A and communicates with the server 14 with the server communications link 22B. The basic operation of the embodiments of FIGS. 1 and 3 is the same, but the design of some servers 14 may make it more convenient and/or effective to tie directly into the server 12 to take advantage of more of the server's inherent line switching abilities. In the case of servers having a less open architecture, the embodiment of FIG. 3 may be used.

Figure 4:
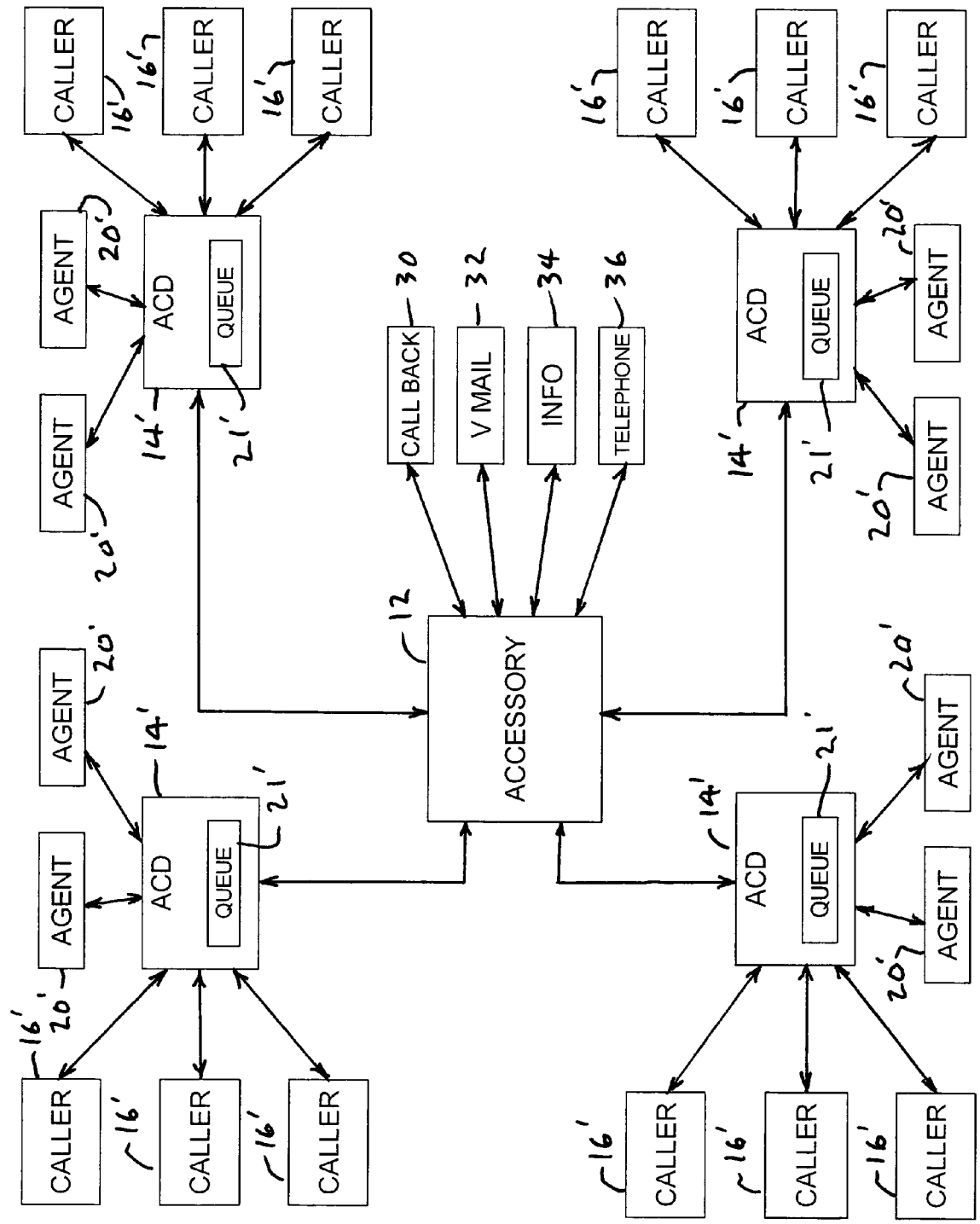
FIG. 4 is a block diagram of another embodiment of a system for assigning resources to clients according to the invention.

Referring to FIG. 4, a more specific application of the accessory 12 includes clients in the form of callers 16', servers in the form of ACDs 14', primary resources in the from the agents 20' and various secondary resources, such as an automatic call back system 30, a voice mail system 32, an information on demand system 34 and a non-agent telephone instrument 36.

The operation of the accessory 12' is essentially as described above, but it is useful to consider the case of accessing the call back system 30. A caller 16' wishing to be connected to an agent 20' is instead placed in the auxiliary queue 28. By choice or otherwise, the caller 16' is connected to the call back system 30. The call back system 30 obtains the call back information from the caller 16' and physically disconnects the caller 16', but the call back system 30 and the accessory 12 maintain the caller 16' as a "virtual" connection.

The accessory 12 keeps the call in the auxiliary queue 28 and the call back system 30 monitors the progress of the call in the auxiliary queue 28. When the call back system 30 determines that the call is about to be transferred to one of the primary queues 21', it reestablishes the physical call and the caller 16' is connected to the agent 20'.

If the auxiliary queue 28 is being operated in FIFO mode, this connection between the caller 16' and the agent 20' will occur essentially at the same time the caller 16' would have been connected had the call remained on physical "hold" the entire time.

Without the accessory 12, this call back at the same time the original call would have connected to an agent would be very improbable because the caller's order in the queue would have been lost when the call back system was initially connected to the caller.

In some cases, it may be advantageous to combine the accessory 12 with the call back system 30 as a single unit.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An accessory device for a plurality of servers, said servers allocating client primary resource requests to primary resources, each server having a primary queue, said device comprising:
   a controller;
   a plurality of server communication links configured to communicate with respective servers and to intercept client primary resource requests from multiple servers in response to said controller;
   an auxiliary queue, said device storing said intercepted requests from multiple servers in said auxiliary queue in response to said controller; and
   a secondary resource communication link configured to communicate with at least one secondary resource, said device allocating secondary resource requests to said at least one secondary resource in response to said controller, wherein said device routes said intercepted requests from multiple servers to a selected server via an at least one of said server communication links in response to a desired condition, said selected server being selected by the controller to balance the primary resource request load between servers.

2. A device according to claim 1, wherein said auxiliary queue is a first in first out queue and said desired condition is at least one of said primary queues having fewer than a threshold number of entries.

3. A device according to claim 1, wherein said at least one secondary resource is a call back system.

4. A device according to claim 1, wherein said at least one secondary resource is a voice mail system.

5. A device according to claim 1, wherein said at least one secondary resource is an information on demand system.

6. A device according to claim 1, wherein said at least one secondary resource is a telephone station that is not a primary resource.

7. A device according to claim 1, wherein said primary resources include service agents.

8. An accessory device for a plurality of automatic call directors, said directors allocating caller primary resource requests to primary resources, each director having a primary queue, said device comprising:
   a controller;
   a plurality of director communication links configured to communicate with respective directors and to intercept caller primary resource requests from multiple directors in response to said controller;
   an auxiliary queue, said device storing said intercepted requests from multiple directors in said auxiliary queue in response to said controller; and
   a secondary resource communication link configured to communicate with at least one secondary resource, said device allocating secondary resource requests to said at least one secondary resource in response to said controller, wherein said device routes said intercepted requests from multiple directors to a selected director via an at least one of said director communication links in response to a desired condition, said selected director being selected by the controller to balance the primary resource request load between directors.

9. A device according to claim 8, wherein said auxiliary queue is a first in first out queue and said desired condition is at least one of said primary queues having fewer than a threshold number of entries.

10. A device according to claim 8, wherein said at least one secondary resource is a call back system.

11. A device according to claim 8, wherein said at least one secondary resource is a voice mail system.

12. A device according to claim 8, wherein said at least one secondary resource is an information on demand system.

13. A device according to claim 8, wherein said at least one secondary resource is a telephone station that is not a primary resource.

14. A device according to claim 8, wherein said primary resources include service agents.

15. An accessory device for a plurality of automatic call director, said director allocating callers to service agents, each said director having a primary queue, said device comprising:
   a controller;
   a plurality of director communication links configured to communicate with a respective director and to intercept calls from multiple directors in response to said controller;
   an auxiliary queue, said device storing said intercepted calls from multiple directors in said auxiliary queue in response to said controller; and
   a secondary resource communication link configured to communicate with a call back system, said device allocating call back requests to said call back system in response to said controller, wherein said device routes said calls from multiple directors to a selected director via an at least one of said director communication links in response to a desired condition, said selected director being selected by the controller to balance the call load between directors.

16. A device according to claim 15, wherein said auxiliary queue is a first in first out queue and said desired condition is at least one of said primary queues having fewer than a threshold number of entries.

* * * * *